(12) United States Patent
Johansson et al.

(10) Patent No.: US 8,972,138 B2
(45) Date of Patent: Mar. 3, 2015

(54) METHOD AND MODULE FOR CONTROLLING A VEHICLE'S SPEED (75) Inventors: Oskar Johansson, Stockholm (SE); Maria Södergren, Segeltorp (SE); Fredrik Roos, Segeltorp (SE)

(73) Assignee: Scania CV AB (SE)

( * ) Notice: Subject to any disclaimer, the term of this patent is extended or adjusted under 35 U.S.C. 154(b) by 170 days.

(21) Appl. No.: 13/703,176

(22) PCT Filed: Jun. 21, 2011

(86) PCT No.: PCT/SE2011/050808
§ 371 (c)(1),
(2), (4) Date: Dec. 10, 2012

(87) PCT Pub. No.: WO2011/162705
PCT Pub. Date: Dec. 29, 2011

(65) Prior Publication Data
US 2013/0085651 A1    Apr. 4, 2013

(30) Foreign Application Priority Data

Jun. 23, 2010    (SE) ...................................... 1050666

(51) Int. Cl.
*G06F 17/00*    (2006.01)
*G06F 19/00*    (2011.01)
(Continued)

(52) U.S. Cl.
CPC .............. *B60K 31/00* (2013.01); *B60W 30/143* (2013.01); *B60W 50/087* (2013.01); *B60W 2550/143* (2013.01); *B60W 2550/402* (2013.01); *B60W 2720/103* (2013.01); *Y02T 10/84* (2013.01)
USPC ................ 701/70; 701/84; 701/93; 701/32.1; 701/409; 340/995.14; 180/170; 180/282

(58) Field of Classification Search
USPC ......... 701/36, 70, 91, 93, 94, 123, 32.1, 32.3, 701/32.4, 32.5, 32.9, 33.4, 400, 408, 409, 701/423, 424, 425, 532, 83, 84; 340/988, 340/989, 995.14, 995.27; 180/170, 197, 180/271, 282
See application file for complete search history.

(56) References Cited

U.S. PATENT DOCUMENTS

2004/0068359 A1    4/2004    Neiss et al.
2005/0055157 A1    3/2005    Scholl
(Continued)

FOREIGN PATENT DOCUMENTS

DE    103 27 255 A1    2/2004
DE    10 2009 030 784 A1    2/2010
WO    WO 01/15927 A1    3/2001

OTHER PUBLICATIONS

International Search Report dated Oct. 6, 2011 issued in corresponding international application No. PCT/SE2011/050808.
(Continued)

*Primary Examiner* — Thomas Tarcza
*Assistant Examiner* — Edward Pipala
(74) *Attorney, Agent, or Firm* — Ostrolenk Faber LLP (57) ABSTRACT

A method for controlling a vehicle's speed by adopting a desired speed $v_{set}$ for the vehicle; determining a horizon for the intended itinerary made up of route segments, effecting the following during each of a number of simulation cycles (s) each comprising a number N of simulation steps conducted at a predetermined frequency f: first predicting the vehicle's speed $v_{pred\_cc}$ along the horizon with conventional cruise control when $v_{set}$ is presented as reference speed, comparing the predicted vehicle speed $v_{pred\_cc}$ in a range $v_{min}$ to $v_{max}$, making a second prediction of the vehicle's speed $v_{pred\_Tnew}$ along the horizon based on the vehicle's engine torque T; determining a reference value for how the vehicle's speed is to be influenced on the basis of at least one of the comparisons and the predicted vehicle speed $v_{pred\_Tnew}$; controlling the vehicle by the reference value. A module for the foregoing controls a vehicle's speed.

26 Claims, 6 Drawing Sheets (51) Int. Cl.
*B60K 31/00* (2006.01)
*G05D 1/00* (2006.01)
*G01C 21/26* (2006.01)
*B60W 30/14* (2006.01)
*B60W 50/08* (2012.01)

(56) References Cited

U.S. PATENT DOCUMENTS

2009/0259354 A1* 10/2009 Krupadanam et al. .......... 701/22
2010/0030447 A1* 2/2010 Smyth et al. .................. 701/102
2010/0049400 A1 2/2010 Duraiswamy et al.
2011/0313647 A1* 12/2011 Koebler et al. ............... 701/123

OTHER PUBLICATIONS

Hellström, E. et al.: 'Look-ahead control for heavy trucks to minimize trip time and fuel consumption', Control Engineering Practice, 2009:, vol. 17, No. 2, pp. 245-254, ISSN 0967-0661, Feb. 2009.

Eric Hellström, "Explicit use of road topography for model predictive cruise control in heavy trucks" ISRN: LiTH-ISY-EX-05/3660—SE, Feb. 21, 2005.

* cited by examiner

METHOD AND MODULE FOR CONTROLLING A VEHICLE'S SPEED

CROSS-REFERENCE TO RELATED APPLICATIONS

The present application is a 35 U.S.C. §§371 national phase conversion of PCT/SE2011/050808, filed Jun. 21, 2011, which claims priority of Swedish Application No. 1050666-5, filed Jun. 23, 2010, the contents of which are incorporated by reference herein. The PCT International Application was published in the English language.

FIELD OF THE INVENTION

The present invention relates to a method and a module for controlling a vehicle's speed on the basis of its predicted speed.

BACKGROUND TO THE INVENTION

Today's traditional cruise controls maintain a constant reference speed which is usually set by the driver. The value of the reference speed is only altered when the driver him/herself adjusts it while driving. The reference speed is then passed to a control system which controls the vehicle in such a way that, if possible, the vehicle maintains the reference speed. If the vehicle is equipped with an automatic gear change system, its gears change so that it can maintain desired speed.

When cruise control is used in hilly terrain, the cruise control system will try to maintain set speed both uphill and downhill. This sometimes results in the vehicle accelerating over the crest of a hill and potentially into a subsequent downgrade on which it has then to be braked to avoid exceeding the set speed, which is a fuel-expensive way of running the vehicle. Even in cases where it does not accelerate over the crest, the vehicle may of course need to be braked downhill to avoid exceeding the set speed.

To reduce fuel use on undulating roads in particular, economical cruise controls such as Scania's Ecocruise® have been developed. The cruise control tries to estimate the vehicle's current speed and also has knowledge of the historical running resistance. The economical cruise control may also be provided with map data with topographical information. The vehicle is then located on the map, e.g. by means of GPS, and the running resistance along the route ahead is estimated. The vehicle's reference speed may thus be optimised for different types of road in order to save fuel.

An example of a cruise control which uses topographical information is described in the document entitled "Explicit use of road topography for model predictive cruise control in heavy trucks" by Erik Hellström, ISBN: LiTH-ISY-EX-05/3660-SE. The cruise control here is by real-time optimisation, and a cost function is used to define the optimisation criteria. A large number of different solutions are calculated and evaluated, and the solution resulting in least cost is employed. The considerable number of calculations involved makes it necessary to use for the purpose a processor with a suitably large capacity.

In other forms of cruise control the number of possible solutions is reduced by choosing instead to iterate from one solution along the vehicle's intended itinerary. However, the topography of the carriageway, the weight of the vehicle and the performance of the engine may result in differences in demand for processor capacity for determining the reference speed. More calculations are required in the case, for example, of a heavily laden truck with medium-high engine power travelling on an undulating road than in that of a lightly laden truck with a high engine power travelling on a relatively level road. This is because the truck in the first case is likely to accelerate on each downgrade and slow down on each upgrade, whereas in the second case the truck will run quite evenly.

The processor incorporated in the system will therefore be subject to relatively large demands, since the load upon the processor may vary greatly from situation to situation. For example, its capacity needs to be large enough to cope quickly with situations where a large number of calculations have to be done. It therefore needs to be dimensioned to cope with such situations despite the fact that they occur during only a limited proportion of the processor time used.

The object of the present invention is to propose an improved system for controlling a vehicle's speed so that the amount of fuel used can be minimised and, in particular, in such a way that the load upon the processor becomes lighter and more even. A further object of the invention is to propose a simplified cruise control which has predictable behaviour compared with other economical cruise controls.

SUMMARY OF THE INVENTION

At least one of the above objects is achieved by a method for controlling a vehicle's speed which comprises:

adopting a desired speed $v_{set}$ for the vehicle;

determining by means of map data and location data a horizon for the intended itinerary which is made up of route segments with at least one characteristic for each segment;

effecting the following during each of a number of simulation cycles (s) each comprising a number N of simulation steps conducted at a predetermined frequency f:

making a first prediction of the vehicle's speed $v_{pred\_cc}$ along the horizon with conventional cruise control when $v_{set}$ is presented as reference speed, which prediction depends on the characteristics of said segment;

comparing the predicted vehicle speed $v_{pred\_cc}$ with $v_{min}$ and $v_{max}$, which demarcate a range within which the vehicle's speed is intended to be;

making a second prediction of the vehicle's speed $v_{pred\_Tnew}$ along the horizon when the vehicle's engine torque T is a value which depends on the result of said comparison in the latest preceding simulation cycle (s−1);

determining at least one reference value which indicates how the vehicle's speed is to be influenced on the basis of at least one of said comparisons in that simulation cycle (s) and the predicted vehicle $v_{pred\_Tnew}$;

sending to a control system in the vehicle said at least one reference value with respect to which the vehicle is thereupon regulated.

The object or objects are achieved according to another aspect by a module for controlling a vehicle's speed which comprises an input unit adapted to receiving a desired speed $v_{se}$ for the vehicle, a horizon unit adapted to determining by means of map data and location data a horizon for the intended itinerary which is made up of route segments with at least one characteristic for each segment, and a calculation unit adapted to effecting the following during each of a number of simulation cycles (s) each comprising a number N of simulation steps conducted at a predetermined frequency f:

making a first prediction of the vehicle's speed $v_{pred\_cc}$ along the horizon with conventional cruise control when $v_{set}$, is presented as reference speed, which prediction depends on the characteristics of said segment;

comparing the predicted vehicle speed $v_{pred\_cc}$ with $v_{min}$, and $v_{max}$, which demarcate a range within which the vehicle's speed is intended to be;

making a second prediction of the vehicle's speed $v_{pred\_Tnew}$ along the horizon when the vehicle's engine torque T is a value which depends on the result of said comparison in the latest preceding simulation cycle (s−1);

determining at least one reference value which indicates how the vehicle's speed is to be influenced on the basis of at least one of said comparisons in that simulation cycle (s) and the predicted vehicle $v_{pred\_Tnew}$. The module is further adapted to sending to a control system in the vehicle said at least one reference value with respect to which the vehicle is thereupon regulated.

The method described results in a substantially constant load upon the processor, since the same number of predictions are made during each simulation cycle at a constant frequency. The processor load is independent of the power output of the vehicle's engine, the weight of the vehicle and the topography of the route. The processor concerned thus knows how much processor capacity will be needed, which is therefore consistently allocated. The processor load will thus be the same in different situations of changing topology and be independent of the vehicle's engine torque. It is thus also possible for the processor concerned to be dimensioned without having to cater for any extreme worst scenarios but rather to cater for uniform processor load. The processor cost can thus be reduced.

Speed variations ahead along the horizon are predicted for only two different modes of driving the vehicle, resulting in a relatively light processor load. The reference value to be aimed at is then chosen on the basis of the result of the predicted modes of driving. By predicting the vehicle's speed at some other torque, e.g. minimum or maximum torque, it is possible to evaluate whether or not to aim at a certain torque for the vehicle. According to an embodiment, what is presented is $v_{set}$, maximum torque or minimum torque. A reference value aimed at is not altered if the speed $v_{pred\_cc}$ stays within certain limits.

Preferred embodiments are described in the dependent claims and the detailed description.

BRIEF DESCRIPTION OF THE ATTACHED DRAWINGS

The invention is described below with reference to the attached drawings, in which.

DETAILED DESCRIPTION OF PREFERRED EMBODIMENTS OF THE INVENTION

Figure 1:
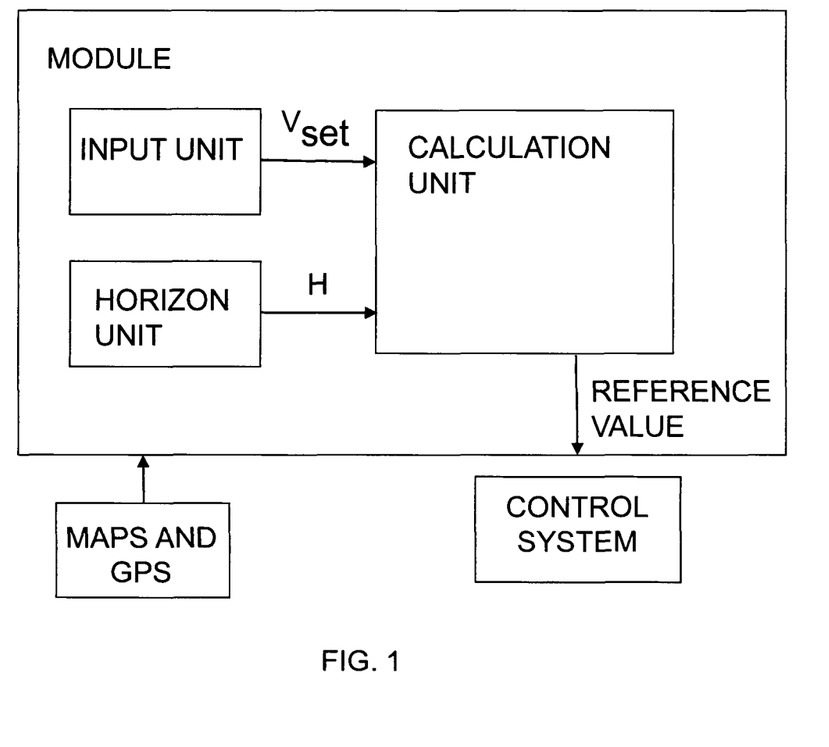
FIG. 1 depicts a module according to an embodiment of the invention.

FIG. 1 depicts a module for controlling a vehicle's speed according to an embodiment of the invention. The module comprises an input unit adapted to receiving a desired speed $v_{set}$ for the vehicle. The driver may for example set a desired speed $v_{set}$ which he/she wishes the vehicle to maintain. The module comprises also a horizon unit adapted to determining a horizon for the intended itinerary by means of map data and location data. The horizon is made up of route segments with at least one characteristic for each segment. An example of a segment's characteristics might be its gradient a in radians.

In the description of the present invention, GPS (Global Positioning System) is indicated for determining location data for the vehicle, but it should be appreciated that other kinds of global or regional positioning systems are also conceivable to provide the vehicle with location data, e.g. systems which use a radio receiver to determine the vehicle's location. The vehicle may also use sensors to scan the surroundings and thereby determine its location.

FIG. 1 illustrates how the module assimilates information about the intended itinerary via maps (map data) and GPS (location data). The itinerary is conveyed bit by bit to the module, e.g. via CAN. The module may be separate from or form part of the control system or systems which are to use reference values for regulating. An example of a control system is the vehicle's engine control system. Alternatively, the map and positioning system unit may also be part of a system which is to use reference values for regulating. In the module, the bits are put together in a horizon unit to form a horizon and are processed by the processor unit to create an internal horizon with respect to which the control system can regulate. The horizon is then continually supplemented by new bits from the GPS and map data unit to maintain a desired length of horizon. The horizon is thus updated continuously when the vehicle is in motion.

CAN (controller area network) is a serial bus system specially developed for use in vehicles. The CAN data bus makes digital data exchange possible between sensors, regulating components, actuators, control devices, etc. and ensures that two or more control devices can have access to the signals from a given sensor in order to use them to control components connected to them.

The module comprises also a calculation unit adapted, during each of a number of simulation cycles (s) each comprising a number N of simulation steps conducted at a predetermined frequency f, to making a first prediction of the vehicle's speed $v_{pred\_cc}$ along the horizon with conventional cruise control when $v_{set}$ is presented as reference speed, which prediction depends on said segment's characteristics. The calculated vehicle speed $v_{pred\_cc}$ is compared with $v_{min}$ and $v_{max}$, which demarcate a range within which the vehicle's speed is intended to be, and a second prediction of the vehicle's speed $v_{pred\_Tnew}$ is made along the horizon when the vehicle's engine torque T is a value which depends on the result of said comparison in the latest preceding simulation cycle (s−1). At least one reference value is determined which indicates how the vehicle's speed is to be influenced on the basis of at least one of said comparisons in that simulation cycle (s) and the predicted vehicle speed $v_{pred\_Tnew}$. The module is further adapted to sending to a control system in the vehicle said at least one reference value with respect to which the vehicle is thereupon regulated. How the predictions are made is explained in more detail below.

The module and/or the calculation unit comprise at least a processor and memory adapted to performing all of the calculations, predictions etc. herein described.

Figure 2:
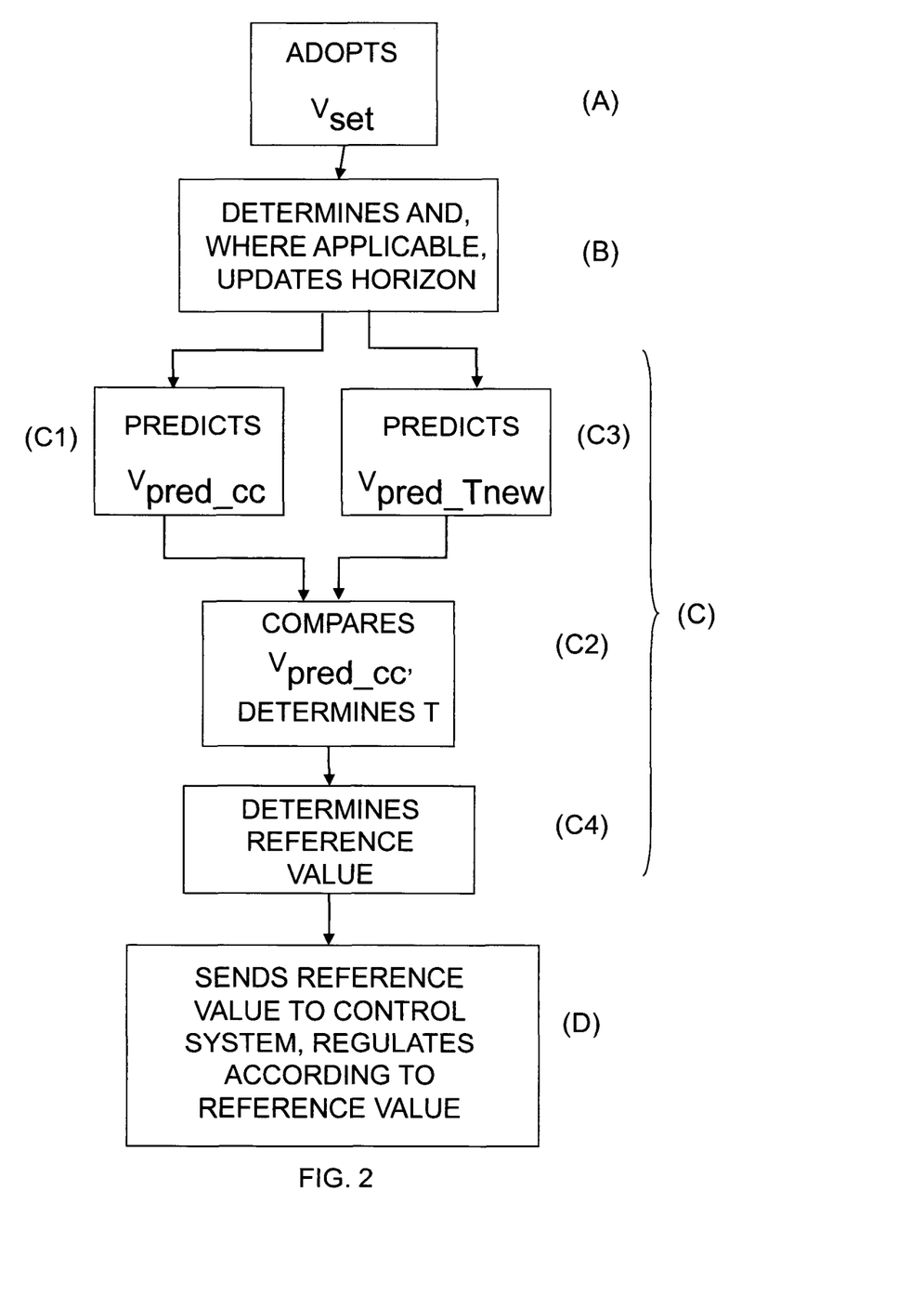
FIG. 2 is a flowchart for the method according to an embodiment of the invention.

FIG. 2 is a flowchart of the steps involved in the method for controlling the vehicle's speed according to an embodiment of the invention. The method comprises as a first step A) adopting $v_{set}$ as a desired speed for the vehicle to maintain, and as a second step B) determining by means of map data and location data a horizon for the intended itinerary made up of route segments with at least one characteristic for each segment. According to the method, a number of simulation cycles (s) are then conducted during the length of the horizon. A simulation cycle (s) comprises C) a number N of simulation steps conducted at a predetermined frequency f and entails C1) making a first prediction of the vehicle's speed $v_{pred\_cc}$ along the horizon with conventional cruise control when $v_{set}$ is presented as reference speed, which depiction depends on said segment's characteristics, C2) comparing the predicted vehicle speed $v_{pred\_cc}$ with $v_{min}$ and $v_{max}$, which demarcate a range within which the vehicle's speed is intended to be, C3) making a second prediction of the vehicle's speed $v_{pred\_Tnew}$ along the horizon when the vehicle's engine torque T is a value which depends on the result of said comparison in the latest preceding simulation cycle (s−1), and C4) determining at least one reference value which indicates how the vehicle's speed is to be influenced on the basis of at least some of said comparisons in that simulation cycle (s) and the predicted vehicle speed $v_{pred\_Tnew}$. As a further step D) said at least one reference value with respect to which the vehicle is to be regulated is sent to a control system in the vehicle. This method achieves a constant and predetermined processor load when the vehicle's reference speed is determined and regulated.

During a simulation cycle (s) the prediction according to C1) and the prediction according to C3) are made in parallel, as illustrated in FIG. 2. The result of the comparison of $v_{pred\_cc}$ with $v_1$ and $v_{max}$ in the latest preceding simulation cycle (s−1) determines the torque T at which $v_{pred\_Tnew}$ is to be predicted in simulation cycle (s). If for example each simulation cycle comprises 100 simulation steps at a frequency of 100 Hz, each simulation cycle takes 1 second.

$v_{set}$ is therefore the driver's input signal of desired cruise control speed, and the reference value is the value with respect to which the vehicle is regulated. The reference value is preferably any from among a reference vehicle speed $v_{ref}$, a reference torque $T_{ref}$ or a reference engine speed $\omega_{ref}$. $v_{ref}$ is presented to the engine control unit's speed regulator.

For traditional cruise controls, $v_{ref}=v_{set}$. The speed regulator then controls the vehicle's speed according to $v_{ref}$ by demanding necessary torque from the engine's torque regulator. When the reference value is instead a reference torque $T_{ref}$, $T_{ref}$ may be sent directly to the engine's torque regulator, and when the reference value is a reference engine speed $\omega_{ref}$, $\omega_{ref}$ may be sent directly to the engine's speed regulator. If $v_{pred\_cc}$ when compared with $v_{min}$ and $v_{max}$ does not go beyond these limits, $v_{set}$ is presented, according to an embodiment, as reference value. The reference value then depends entirely on this comparison. Which reference value will be aimed at for other cases is explained below.

How the various predicted speeds are arrived at will now be explained.

The total force $F_{env}$ acting upon the vehicle from the environment is made up of rolling resistance $F_{roll}$, gravitation F and air resistance $F_{air}$. Gravitation is calculated as $$F = m \cdot g \cdot \alpha \quad (1)$$

where m is the weight of the vehicle and a the gradient of the road in radians. Since mostly only small angles are concerned, sin(α) is approximated to α. Air resistance is calculated as a factor k multiplied by the square of vehicle speed, as follows:

$$F_{env} = F_{roll,present} + m \cdot 9.82 \cdot \alpha + k \cdot v_{i-1}^2 \quad (2)$$

$$F_{roll,present} = F_{roll,est}, \quad (3)$$

$$m = m_{est},$$

$$k = \frac{1}{2} \rho \cdot C_d \cdot A$$

where A is the vehicle's estimated frontal area, $C_d$ the resistance coefficient which depends on the streamline shape of the object, ρ the density of the air and pi the weight of the vehicle estimated by its weight estimation system as $m_{est}$. Current rolling resistance $F_{roll,present}$ is also estimated in the vehicle continuously as $F_{roll,est}$. For calculation of $m_{est}$ and $F_{roll,est}$ please refer to the dissertation entitled "Fuel Optimal Powertrain Control for Heavy Trucks Utilizing Look Ahead" by Maria Ivarsson, Linköping 2009, ISBN 978-91-7393-637-8. $v_{i-1}$ is the vehicle's predicted speed at preceding simulation step.

The force $F_{drive}$ which propels the vehicle forwards depends on which prediction is made, It is taken according to an embodiment as either maximum possible power (maximum torque) or least possible power (minimum torque, e.g. drag torque). It is possible, however, to take any desired force within the range $$F_{min} \leq F_{drive} \leq F_{max} \quad (4)$$

and the vehicle's speed $v_{pred\_Tnew}$ may therefore be predicted at torques other than maximum or minimum torque. $F_{max}$ is calculated as maximum available engine torque, a function of engine speed, multiplied by the total transmission ratio and divided by the effective tyre radius $r_{wheel}$. $F_{min}$ is arrived at in the same way as $F_{max}$ but with minimum torque instead:

$$F_{max} = \frac{T_{max}(\omega) \cdot i_{tot}}{r_{wheel}} \quad (5)$$

$$F_{min} = \frac{T_{min}(\omega) \cdot i_{tot}}{r_{wheel}} \quad (6)$$

where n is the vehicle's engine speed and $i_{tot}$ the vehicle's total transmission ratio.

The vehicle's acceleration Acc is given by:

$$Acc = (F_{drive} - F_{env})/m \quad (7)$$

According to an embodiment, simulation steps during a simulation cycle of N steps have a constant step length which depends on the vehicle's speed. The length dP of each simulation step is given by:

$$dP = K \cdot v_{init} \quad (8)$$

where K is a time constant, e.g. 0.9 s, and $v_{init}$ is prevailing vehicle speed at the beginning of the simulation.

The time dt for a simulation step is given by:

$$dt = dP/v_{i-1} \quad (9)$$

where $v_{i-1}$ is predicted speed at preceding simulation step i−1.

The speed difference dv is:

$$dv = Acc \cdot dt \quad (10)$$

Energy consumed dW for a simulation step is given by:

$$dW = dP \cdot (F_{drive} - F_{min}) \quad (11)$$

The speed $v_i$ at current simulation step becomes:

$$v_i = v_{i-1} + dv \quad (12)$$

Total time $t_i$ for current simulation step is:

$$t_i = t_{i-1} + dt \quad (13)$$

Total energy consumed $W_i$ for current simulation step is:

$$W_i = W_{i-1} + dW \quad (14)$$

Figure 3:
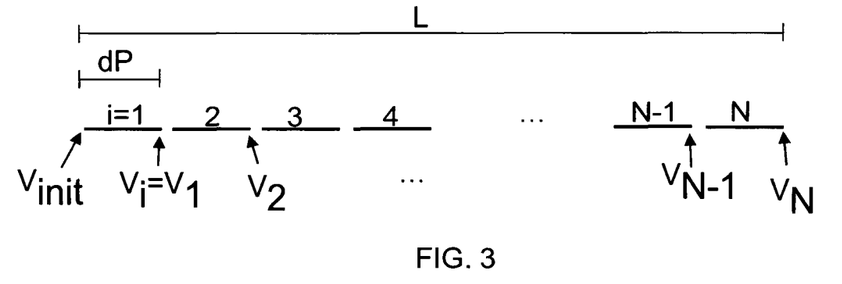
FIG. 3 illustrates a predicted speed during a simulation cycle according to an embodiment of the invention.
Figure 4:
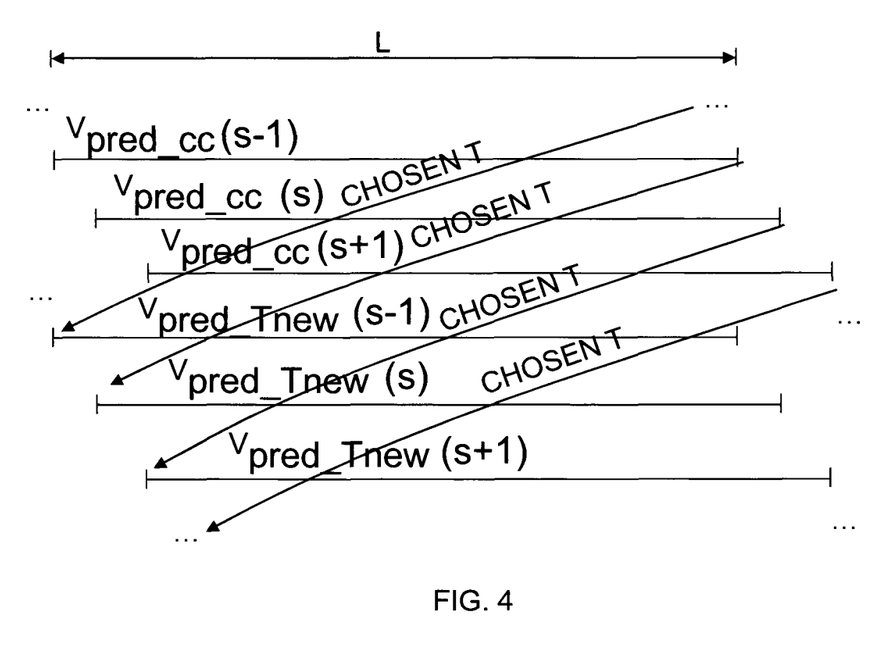
FIG. 4 illustrates a number of simulation cycles according to an embodiment of the invention.

FIG. 3 illustrates how a vehicle speed is predicted during a simulation cycle of N simulation steps with a horizon which is L meters long. The prediction is discontinued after N simulation steps, i.e. after a simulation cycle. A fresh simulation cycle then begins in the next time sample. Each simulation cycle has a predetermined frequency f. At a frequency of 100 Hz, for example, 100 simulation steps are conducted per second. As the length of each simulation step depends on the vehicle's speed $v_{init}$ at the beginning of the prediction, the length of the predicted section of the horizon varies with the vehicle's speed. For example, at 80 km/h (22.22 m/s) the horizon becomes 2 km long if f=100 Hz and K=0.9 s, since each simulation step dP then becomes 20 m long and over 100 steps the horizon then becomes 2 km. FIG. 3 shows a fresh speed $v_i$ predicted at each simulation step i. Since the same number of predictions ($v_{pred\_cc}$ and $v_{pred\_Tnew}$) is made at each simulation step, the processor load depends entirely on the number of simulation steps within the horizon. The number of simulation steps is determined by the frequency f, which is a predetermined value. The maximum processor load can therefore always be determined in advance, which is advantageous in that the processor can accordingly be dimensioned in advance. The processor load is therefore independent of road topography, vehicle weight and engine type. $v_{pred\_cc}$ and $v_{pred\_Tnew}$ may be vectors with N values, or alternatively only maximum and minimum values for $v_{pred\_cc}$ and $v_{pred\_Tnew}$ are saved in each simulation cycle, as explained in more detail below. FIG. 4 illustrates three simulation cycles (s−1), (s) and (s+1) and the predictions made during each cycle. In each cycle, a prediction of $v_{pred\_cc}$ and a prediction of $v_{pred\_Tnew}$ are made. $v_{pred\_cc}$ is compared with $v_{min}$ and $v_{max}$ after each cycle, and the result of this comparison serves as a basis for determining preferably the torque T for $v_{pred\_Tnew}$ for the next cycle, as explained previously and as illustrated in FIG. 4 by arrows marked "CHOSEN T". This is illustrated at step C2 in the flowchart in FIG. 2. Two different vehicle speeds are thus predicted during each simulation cycle. According to an embodiment, $v_{pred\_Tnew}$ is compared with $v_{min}$ and $v_{max}$ after a simulation cycle, and if $v_{pred\_Tnew}$ is below $v_{min}$ or above $v_{max}$ the vehicle has to be controlled with respect to $v_{set}$. If $v_{pre\_Tnew} \geq v_{min}$ and $\leq v_{max}$ the vehicle has instead to be controlled with respect to the torque determined for $v_{pred\_Tnew}$. Each simulation cycle is thus followed by determining whether it is $v_{pred\_cc}$ or $v_{pred\_Tnew}$ which is to influence the vehicle's speed. A control unit is then presented with reference values representing speeds determined which may therefore be either a reference vehicle speed, a reference torque or a reference engine speed.

Reference values which the vehicle's control system is to aim at are thus determined continuously when the vehicle is in motion. They are preferably determined as from a certain predetermined distance ahead of the vehicle and are then synchronised in the control unit so that the calculated reference value for a given situation is set at the right time. An example of such a distance is 50 meters, which the control unit therefore caters for in regulating the vehicle.

Figure 5:
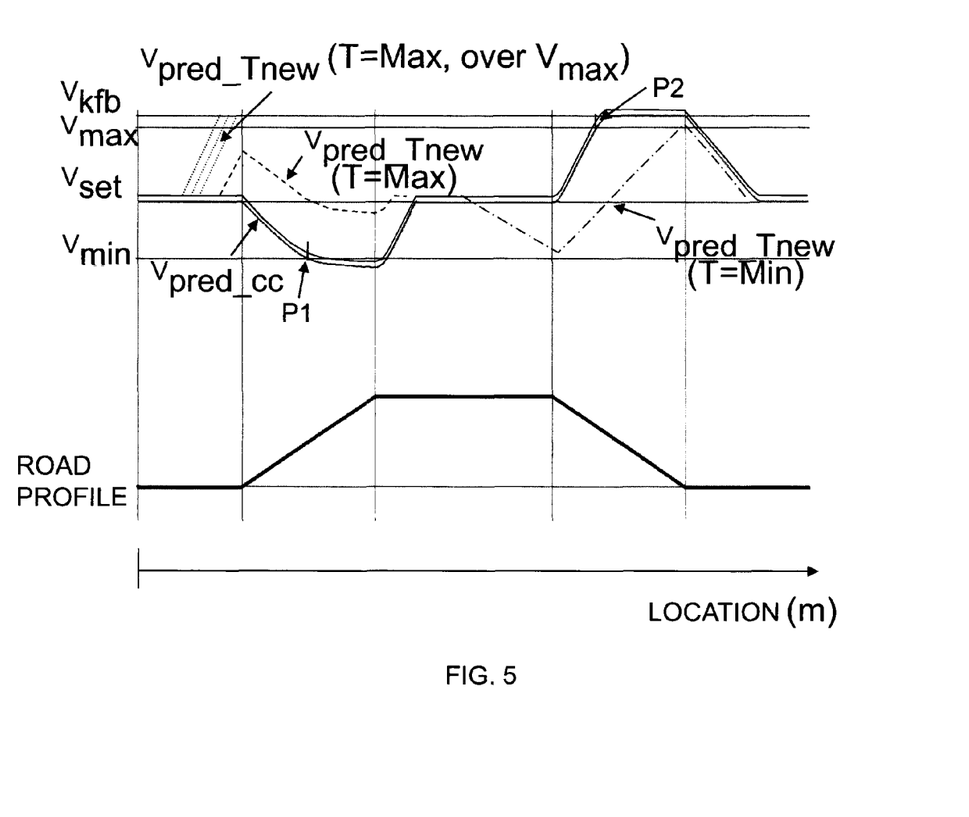
FIG. 5 illustrates the vehicle's predicted speeds according to an embodiment of the invention.
Figure 6:
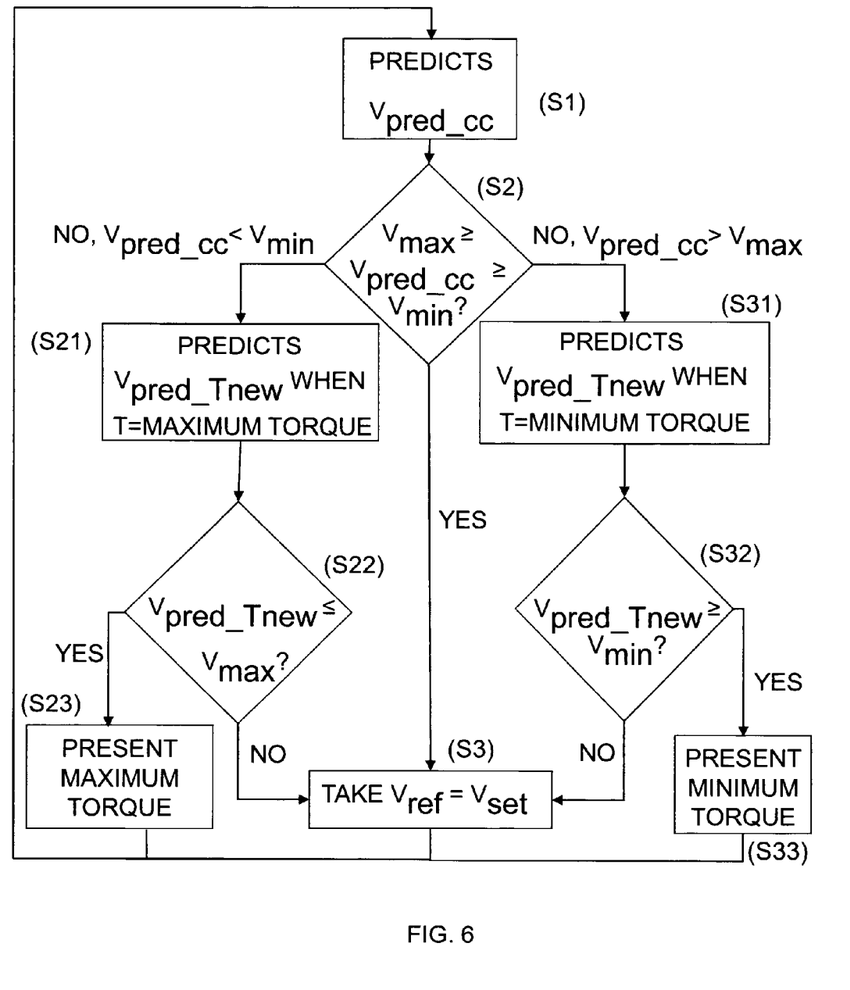
FIG. 6 is a flowchart for the method according to another embodiment of the invention.

An embodiment according to the invention will now be explained with reference to FIGS. 5 and 6. The upper part of FIG. 5 illustrates the predicted speed v with conventional cruise control along a horizon with a road profile which is depicted in the lower part of the diagram. The flowchart in FIG. 6 shows how $v_{pred\_cc}$ is predicted as a first step S1. After $v_{pred\_cc}$ has been predicted clearly during N steps, it is compared with $v_{min}$ and $v_{max}$, as illustrated at the next step S2. If $v_{pred\_cc}$ is below $v_{min}$, an upgrade is identified. If $v_{pred\_cc}$ is above $v_{ma}$, a downgrade is identified. If an upgrade is identified and $v_{pred\_cc}$ is therefore lower than $v_{min}$, as at P1 in FIG. 5, the vehicle's engine torque T in the second prediction $v_{pred\_Tnew}$ is taken as a maximum torque in the next simulation cycle. This is illustrated at step S21 in FIG. 6, see also formula (5), and is represented by a broken line in FIG. 5. This presupposes, however, that $v_{pred\_cc}$ was below $v_{min}$ before potentially going above $v_{max}$. If a downgrade is identified and $v_{pred\_cc}$ is therefore higher than $v_{max}$, as at P2 in FIG. 5, the vehicle's engine torque T in the second prediction $v_{pred\_Tnew}$ is taken as a minimum torque in the next simulation cycle. This is illustrated at step S31 in FIG. 6, see also formula (6), and is represented by a broken line in FIG. 5. This presupposes, however, that $v_{pred\_cc}$ was higher than $v_{max}$ before potentially going below $v_{min}$. According to an embodiment, the calculation unit described with reference to FIG. 1 is adapted to performing the calculations etc. described.

If $v_{pred\_cc}$ is higher than or equal to $v_{min}$ and lower than or equal to $v_{max}$, $v_{ref}$ is taken as a reference value which represents $v_{set}$, as illustrated at step S3 in FIG. 6. The reference value is then preferably taken as $v_{set}$. This means for example that no hill is identified and hence that $v_{pred\_cc}$ is outside the speed range or that the vehicle will be travelling on a level road. $v_{set}$ therefore then becomes the reference speed with respect to which the vehicle's control system is to regulate. $v_{pred\_Tnew}$ is preferably still predicted at maximum or minimum torque in order to achieve uniform processor load.

If a hill is identified, a preferred embodiment applies rules for determining the reference value with respect to which the vehicle is to be regulated. The calculation unit is then adapted to applying rules for determining the reference value. One rule comprises comparing the vehicle speed $v_{pred\_Tnew}$ in the second prediction with $v_{min}$ and $v_{max}$, which demarcate a range within which the vehicle's speed is intended to be. Another rule is that if $v_{pred\_Tnew}$ in the second prediction is between $v_{min}$ and $v_{max}$ or equal to $v_{min}$ or $v_{max}$ the vehicle's aimed-at reference value is determined as a value which represents the predicted speed $v_{pred\_Tnew}$. It is thus possible to ensure that the vehicle's speed will not go above or below the speed limits if maximum or minimum torque is presented. In FIG. 5, three dotted lines in the upper diagram illustrate how $v_{pred\_Tnew}$ is predicted at maximum torque and is then predicted to exceed $v_{max}$. As this scenario is undesirable, $v_{set}$ is presented as reference value. Only when $v_{pred\_Tnew}$ is predicted to not go above $v_{max}$ may a reference value representing that speed be presented.

This is illustrated in the flowchart in FIG. 6, so if $v_{pred\_Tnew}$ is predicted at maximum torque it is compared with $v_{max}$ at a step S22. If $v_{pred\_Tnew}$ is lower than or equal to $v_{max}$, the vehicle's maximum torque has to be presented as reference value (step S23). A maximum torque is preferably presented at the time when $v_{pred\_cc}$ goes below $v_{min}$, provided that $v_{pred\_Tnew}$ is predicted not to exceed $v_{max}$. Similarly, if $v_{pred\_Tnew}$ is predicted at a minimum torque, it is compared with $v_{min}$ at a step S32. If $v_{pred\_Tnew}$ is higher than or equal to $v_{min}$, the vehicle's minimum torque has to be presented as reference value (step S33). A minimum torque is therefore preferably presented at the time when $v_{pred\_cc}$ exceeds $v_{max}$, provided that $v_{pred\_Tnew}$ is predicted to not go lower than $v_{min}$.

For the vehicle to reach minimum or maximum torque, the reference speed $v_{ref}$ may be presented with an offset. Minimum torque may for example be presented by presenting the reference speed $v_{ref}$ as a low value below $v_{min}$, e.g. $v_{min} - k_1$ where $k_1$ is within the range 1-10 km/h. The engine's control unit will then present drag torque for the engine.

Maximum torque may be reached by the reference speed being presented as a high speed above $v_{max}$, e.g. $v_{max}+k_2$, where $k_2$ is within the range 1-10 km/h.

Another rule is that if $v_{pred\_Tnew}$ in the second prediction is above $v_{max}$ or below $v_{min}$, the vehicle's reference value is taken as $v_{set}$. This is illustrated by step S3 in FIG. 6.

At the next sample, e.g. at each second, the method starts again from S1. The time taken to perform the calculations is adapted so that the whole method is run through during a simulation cycle.

Figure 7:
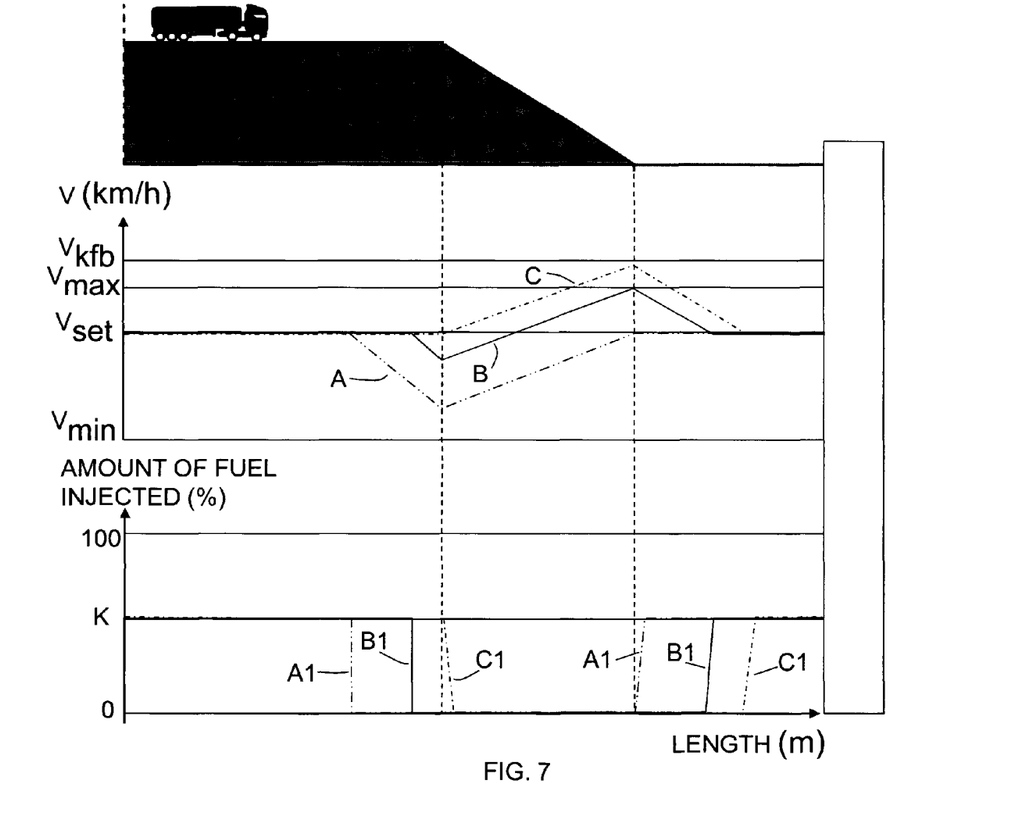
FIG. 7 illustrates an alternative embodiment according to the invention.

FIG. 7 illustrates three different speed profiles A, B and C and the amount of fuel injected A1, B1 and C1 during corresponding periods, when a vehicle is predicted to travel down a hill. Speed profile A illustrates an alternative embodiment of the invention whereby $v_{ref}$ continually drops as far as possible, but not below $v_{min}$, to save extra fuel at the expense of longer run time. The amount of fuel injected is thus reduced or throttled at an earlier stage than in the other driving modes illustrated. It is however desired to revert to $v_{set}$ after the downgrade, as illustrated in the diagram. Reduced fuel consumption is thus prioritised in that lowerings take place so long as the vehicle's speed can thereafter revert to $v_{set}$. This embodiment may for example be implemented in the method illustrated in the flowchart in FIG. 6 by $v_{max}$ at step S2 being taken as $v_{set}$ and/or by $v_{ref}$ being taken as $v_{min}$ at step S3. This results in no overspeed nor any increased losses due, for example, to air resistance. As the lowering of the vehicle's speed takes place earlier and to a lower speed, the result is reduced fuel consumption. This also makes it possible for lighter vehicles with a gross weight of less than about 30 tonnes to save fuel to a greater extent. Speed profile B in FIG. 7 illustrates a driving mode according to earlier embodiments of the invention, and speed profile C a driving mode whereby the vehicle is run with traditional cruise control. $v_{kfb}$, represents the speed limit for driving with traditional cruise control. B1 and C1 illustrate amounts of fuel injected during corresponding periods. K is a percent value for the amount of fuel injected.

According to an embodiment, the highest speed $v_{pred\_cc,max}$ and the lowest speed $v_{pred\_cc,min}$ during the first prediction of the vehicle's speed $v_{pred\_cc}$ with ordinary cruise control are determined and are then used in the comparison with $v_{max}$ and $v_{min}$ to determine the vehicle's engine torque T in the second prediction. The calculation unit is then adapted to performing these calculations. It is therefore only necessary to save scalars instead of whole vectors, thereby saving memory space. Nor need the values be saved after they have been used in the simulation cycle, since no adjustment of reference values takes place rearwards in the horizon and they will not be used again for calculations. This difference compared with some other calculation algorithms saves processor capacity and helps to achieve constant processor load. In the same way it is also possible for the highest and lowest speeds for the prediction of $v_{pred\_Tnew}$ to be determined during a simulation cycle.

According to an embodiment, a hysteresis is added to the reference value, e.g. $v_{ref}$, in order to avoid jerky regulation and to avoid missing some fuel saving. The calculation unit is then adapted to adding this hysteresis to the reference value $v_{ref}$. To avoid the speed reference $v_{set}$ aimed at being altered at each simulation cycle, e.g. at each second, $v_{ref}$ is allowed to go somewhat outside the speed range bounded by $v_{min}$ and $v_{max}$. This deviation may for example be 1 or 2 km/h beyond $v_{min}$ or $v_{max}$. When for example the vehicle's torque is determined as minimum torque, $v_{ref}$ may be allowed to go somewhat beyond $v_{min}$, as illustrated in the following example:

| | Time: | | | | | | | | | |
|---|---|---|---|---|---|---|---|---|---|---|
| | 1 | 2 | 3 | 4 | 5 | 6 | 7 | 8 | 9 | 10 seconds |
| $v_{ref}$: | 80 | 80 | 70 | 70 | 80 | 70 | 70 | 70 | 70 | 70 |
| $v_{pred\_cc,min}$: | 67 | 69 | 72 | 71 | 69 | 71 | 71 | 71 | 71 | 71 |
| $v_{ref}$ with hysteresis: | 80 | 80 | 72 | 71 | 69 | 68 | 68 | 68 | 68 | 68 |

In this example it may be seen that $v_{pred\_cc,min}$ goes below the speed limit $v_{min}$ of 70 km/h at 5 seconds. $v_{pred\_cc,min}$ is then 69 km/h. $v_{ref}$ should then really be presented at maximum torque, causing $v_{ref}$ at 5 seconds to be 80 km/h. In the next time sample, however, $v_{pred\_cc,min}$ goes back above the $v_{min}$ limit, which means that a different $v_{ref}$ is presented. To avoid $v_{ref}$ varying greatly as short intervals, a $v_{ref}$ value which is somewhat below $v_{min}$ is presented instead.

According to another embodiment, $v_{min}$ and $v_{max}$ are aimed at as reference values. This embodiment is an alternative to using hysteresis or to adding a constant $k_1$ or $k_2$ to the reference value and may therefore be used to avoid jerky regulation or to reach a certain low or high torque. The embodiment results in less sensitivity to any errors in the speed predictions and avoids driver irritation by not going below $v_{min}$ or above $v_{max}$.

An embodiment takes into account the engine's efficiency and comfort/drivability when choosing which control strategies to predict (i.e. that which results in $v_{pred\_Tnew}$). Taking as magnitude and/or time the torque which results in $v_{pred\_Tnew}$ differently depending on the engine's efficiency or on the basis of comfort requirements makes it possible to achieve comfortable and economical cruise control. This may be implemented on the basis of rules whereby for example there is a certain torque at a certain engine speed, or whereby torque which results in more acceleration than a certain limit value is never allowed.

The invention comprises also a computer programme product comprising programme instructions for enabling a computer system in a vehicle to perform steps according to the method described when the instructions are run on said computer system. The invention comprises also a computer programme product in which the instructions are stored on a medium which can be read by a computer system.

The present invention is not restricted to the embodiments described above. Sundry alternatives, modifications and equivalents may be used. The above embodiments therefore do not limit the scope of the invention, which is defined by the attached claims.

The invention claimed is:

1. A method for controlling a vehicle's speed which comprises:
 receiving a desired speed $v_{set}$ for the vehicle;
 determining by means of map data and location data a horizon for the intended itinerary which is made up of route segments with at least one characteristic for each segment;
 effecting the following during each of a number of simulation cycles (s) each simulation cycle comprising a number N of simulation steps conducted at a predetermined frequency f:
 in a first prediction, calculating a first predicted vehicle speed $v_{pred\_cc}$ along the horizon with conventional cruise control using $v_{set}$ as reference speed, and based on the characteristics of a segment;

comparing the first predicted vehicle speed $v_{pred\_cc}$ with a minimum speed value $v_{min}$ and a maximum speed value $v_{max}$, which demarcate an intended range for the vehicle's speed;

in a second prediction, calculating a second predicted vehicle speed $v_{pred\_Tnew}$ along the horizon using a torque value T when first predicted vehicle speed $v_{pred\_cc}$ is higher than the maximum speed $v_{max}$ or less than the minimum speed value $v_{min}$, the torque value T being selected based on the comparison resulting from comparing in a latest preceding simulation cycle (s−1);

determining at least one reference value which indicates how the vehicle's speed is to be influenced based on at least one of the comparison in simulation cycle (s) and the predicted vehicle speed $v_{pred\_Tnew}$; and sending to a control system in the vehicle the at least one reference value based on which the vehicle is thereupon regulated.

2. A method according to claim 1, further comprising performing a series of N of the simulation steps to define a cycle of the simulation steps, and the simulation steps during a simulation cycle of N said simulation steps have a constant step length which depends on the vehicle's speed.

3. A method according to claim 1, wherein the reference value is selected from among a reference vehicle speed $v_{ref}$, a reference torque $T_{ref}$ or a reference engine speed $\omega_{ref}$.

4. A method according to claim 1, further comprising performing a series of N of the simulation steps to define a cycle of the simulation steps, and wherein if $v_{pred\_cc}$ is higher than $v_{max}$, the torque value T in the second prediction is taken as a minimum torque in subsequent simulation cycles.

5. A method according to claim 4, further comprising detecting the highest speed $v_{pred\_cc,max}$ during the second prediction of the vehicle's speed $v_{pred\_cc}$ with ordinary cruise control and then using $v_{pred\_cc,max}$ in the comparison with $v_{max}$ and $v_{min}$ to determine the torque value T in the second prediction.

6. A method according to claim 1, further comprising performing a series of N of the simulation steps to define a cycle of the simulation steps, and wherein if $v_{pred\_cc}$ is lower than $v_{min}$ the torque value T in the second prediction, that torque is taken as a maximum torque in subsequent simulation cycles.

7. A method according to claim 6, further comprising detecting the highest speed $v_{pred\_cc,min}$ during the second prediction of the vehicle's speed $v_{pred\_cc}$ with ordinary cruise control and then using $v_{pred\_cc,min}$ in the comparison with $v_{max}$ and $v_{min}$ to determine the torque value T in the second prediction.

8. A method according to claim 1, further comprising adding a hysteresis to $v_{ref}$.

9. A method according to claim 1, further comprising applying rules to determine the reference value with respect to which the vehicle is to be regulated.

10. A method according to claim 9, comprising a rule wherein the vehicle speed $v_{pred\_Tnew}$ in the second prediction is compared with $v_{min}$ and $v_{max}$, to demarcate a range for the vehicle's speed.

11. A method according to claim 10, comprising a rule wherein if $v_{pred\_Tnew}$ in the second prediction is higher than $v_{max}$ or lower than $v_{min}$, the vehicle's reference value is determined as a value which represents $v_{set}$.

12. A method according to claim 10, comprising a rule wherein if $v_{pred\_Tnew}$ in the second prediction is between $v_{min}$ and $v_{max}$ or equal to $v_{min}$ or $v_{max}$, the vehicle's reference value is determined as a value which represents the predicted speed $v_{pred\_Tnew}$.

13. A computer program product comprising non-transitory program instructions for causing a computer system in a vehicle to perform steps according to the method of claim 1 when the instructions are run on said computer system.

14. A computer program product according to claim 13, in which the program instructions are stored on a non-transitory computer-readable medium which can be read by a computer system.

15. A module for controlling a vehicle's speed, which comprises:

an input unit configured for receiving a desired speed $v_{set}$ for the vehicle;

a horizon unit configured for determining by means of map data and location data a horizon for an intended itinerary which is comprised of route segments with at least one characteristic for each segment;

a calculation unit configured for effecting the following during each of a number of simulation cycles (s) wherein each cycle comprises a number N of simulation steps conducted at a predetermined frequency f, the steps each comprising:

calculating to make a first prediction of vehicle speed $v_{pred\_cc}$ along a horizon with a conventional cruise control using $v_{set}$ as a reference speed, wherein the first prediction depends on the characteristics of the segment;

comparing vehicle speed $v_{pred\_cc}$ with a minimum speed value $v_{min}$ and a maximum speed value $v_{max}$, which demarcate a range of the vehicle's intended speed;

calculating to make a second prediction of vehicle speed $v_{pred\_Tnew}$ along the horizon using torque value T when the first predicted value speed $v_{pred\_cc}$ is higher than the maximum speed value $v_{max}$ or less than the minimum speed value $v_{min}$, the torque value T being selected based on comparison resulting from comparing in the latest preceding simulation cycle (s−1);

determining at least one reference value which indicates how the vehicle's speed is to be influenced based at least one of the comparison in simulation cycle (s) and the predicted vehicle speed $v_{pred\_Tnew}$; and the module is further configured for sending to a control system in the vehicle said at least one reference value based on which the vehicle is thereupon regulated.

16. A module according to claim 15, wherein the simulation steps during a simulation cycle of N simulation steps have a constant step length which depends on the vehicle's speed, and the calculation unit is configured for adjusting the step length according to the vehicle's speed.

17. A method according to claim 15, wherein the reference value is selected from among a reference vehicle speed $v_{ref}$, a reference torque $T_{ref}$ or a reference engine speed $\omega_{ref}$.

18. A module according to claim 15, wherein the calculation unit is configured for calculating if $v_{pred\_cc}$ is higher than $v_{max}$, and then is configured for taking the torque value T in the second prediction as a minimum torque in subsequent simulation cycles.

19. A module according to claim 18, wherein the calculation unit is configured for determining the highest speeds $v_{pred\_cc,max}$ during the second prediction of the vehicle's speed $v_{pred\_cc}$ with ordinary cruise control, and to using the $v_{pred\_cc,max}$ in the comparison with $v_{max}$ and $v_{min}$ to determine the torque value T in the second prediction.

20. A module according to claim 15, wherein the calculation unit is configured for calculating if $v_{pred\_cc}$ is lower than $v_{min}$ and is configured for taking the torque value T in the second prediction as a maximum torque in subsequent simulation cycles.

21. A module according to claim 20, wherein the calculation unit is configured for determining the lowest speeds $v_{pred\_cc,min}$ during the second prediction of the vehicle's speed $v_{pred\_cc}$ with ordinary cruise control, and to using the $v_{pred\_cc,min}$ in the comparison with $v_{max}$ and $v_{min}$ to determine the torque value T in the second prediction.

22. A module according to claim 15, wherein the calculation unit is configured for adding a hysteresis to $v_{ref}$.

23. A module according to claim 15, wherein the calculation unit is configured for applying rules for determining the reference value with respect to which the vehicle is to be regulated.

24. A module according to claim 23, comprising a rule wherein the vehicle speed $v_{pred\_Tnew}$ in the second prediction is compared with $v_{min}$ and $v_{max}$, to demarcate a range for $v_{pred\_Tnew}$.

25. A module according to claim 24, comprising a rule wherein if $v_{pred\_Tnew}$ in the second prediction is higher than $v_{max}$ or lower than $v_{min}$, the vehicle's reference value is determined as a value which represents $v_{set}$.

26. A module according to claim 24, comprising a rule wherein if $v_{pred\_Tnew}$ in the second prediction is between $v_{min}$ and $v_{max}$ or equal to $v_{min}$ or $v_{max}$, the vehicle's reference value is determined as a value which represents the predicted speed $v_{pred\_Tnew}$.

* * * * *